United States Patent [19]

Glover, Jr. et al.

[11] Patent Number: 4,917,202

[45] Date of Patent: Apr. 17, 1990

[54] AIR INLET DEFLECTOR ASSEMBLY FOR AN AIR CLEANER

[75] Inventors: Glen A. Glover, Jr., Washington, Ill.; Walter A. Harrison, Jr., Glendale, Ariz.; Richard E. Guhl; Danny L. White, both of Decatur, Ill.

[73] Assignee: Caterpillar Inc., Peoria, Ill.

[21] Appl. No.: 286,416

[22] Filed: Dec. 19, 1988

[51] Int. Cl.$^4$ ............................................. B01D 50/00
[52] U.S. Cl. ..................................... 180/68.3; 55/385.3
[58] Field of Search ............................ 180/68.3, 68.1; 55/385.3, 385.1, 385.7, 463

[56] References Cited

U.S. PATENT DOCUMENTS

| | | | |
|---|---|---|---|
| 2,853,153 | 9/1958 | Sexton | 180/68.3 |
| 3,737,002 | 6/1973 | Yotsumoto | 180/68.3 |
| 4,198,217 | 4/1980 | Edmannsdorfer | 180/68.3 |
| 4,689,060 | 8/1987 | Koske | 180/68.3 |

*Primary Examiner*—David M. Mitchell
*Attorney, Agent, or Firm*—Kenneth A. Rhoads

[57] ABSTRACT

Fast moving off-highway vehicles, such as trucks, may have restricted operating capability in rainy, wet weather because of foreign material, such as water, being ingested into their exposed air cleaner and thus their engines. To operate in these conditions it is desirable that their air cleaner be adapted to include an air inlet deflector assembly. The deflector assembly includes a plurality of formed shields and a splash deflector. The shields overlap the inlet ports and in combination with the splash deflector define a labyrinth path for air entering the air cleaner. The splash deflector includes downwardly inclined blocking edges to block and redirect material away from the inlet passages.

3 Claims, 3 Drawing Sheets

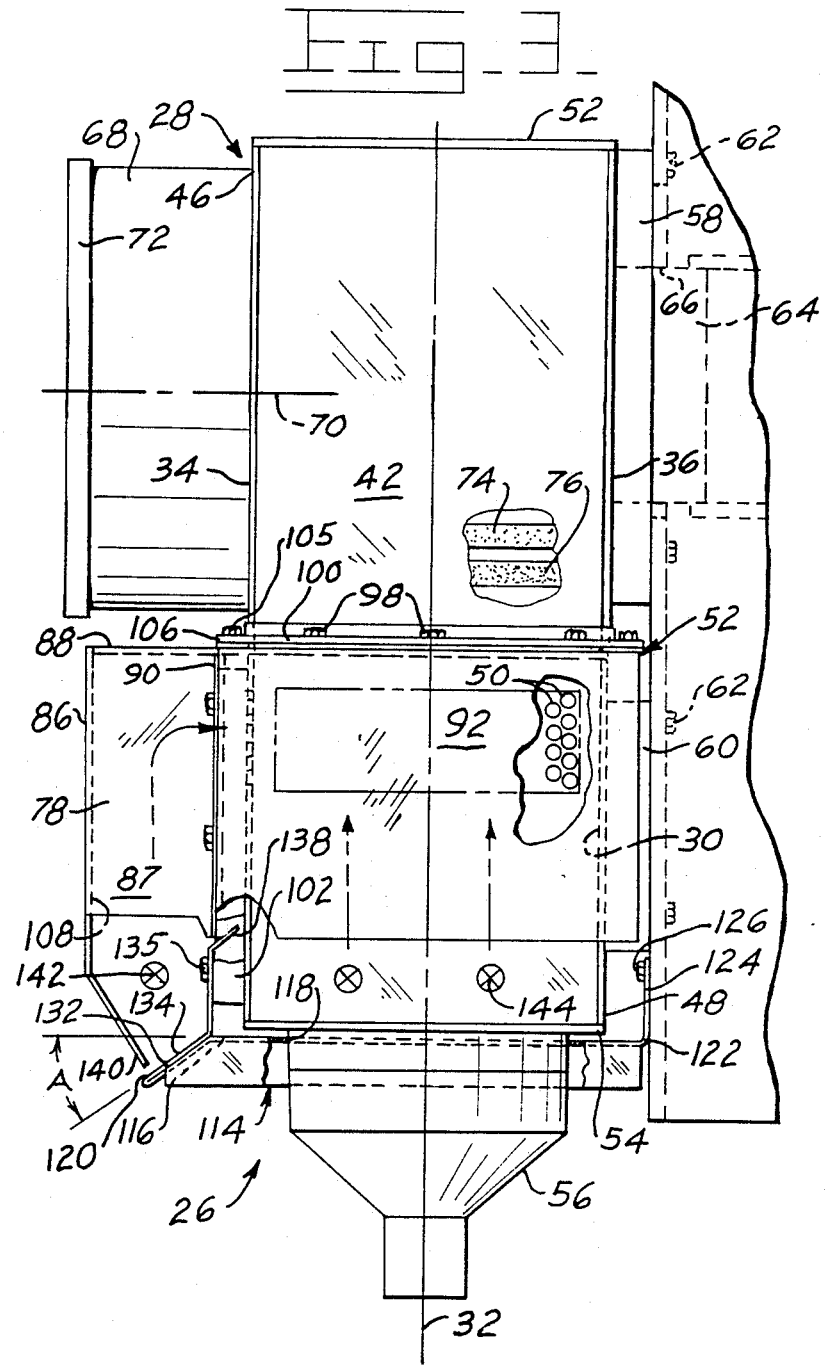

4,917,202

AIR INLET DEFLECTOR ASSEMBLY FOR AN AIR CLEANER

DESCRIPTION

1. Technical Field

This invention relates generally to an air cleaner for an internal combustion engine and more particularly to an air cleaner having an air inlet deflector assembly to block and redirect foreign material away from passages for ducting air to inlet ports and thus the engine.

2. Background Art

In the earthmoving industry it is becoming common practice to operate year around, and often times in environmental conditions that are not totally satisfactory. It is not unusual to observe vehicles, such as off-highway trucks or the like, working in, for example, heavy rain or where it has rained a considerable amount. Rainy weather often times turns once good haul roads into seas of mud latent with pot holes. The faster vehicles, especially the trucks, travel in clouds of mud and water caused by the large exposed tires splashing and propelling the mud and water ahead of, behind, and to the sides of the vehicle. The engines of these vehicles require large quantities of clean air for the combustion process. It is common practice to mount air cleaners for the engines external of the vehicle and in a relatively pollution free location and where it can be easily serviced, such as on the front fenders of the vehicle. Also, with externally mounted air cleaners it is common practice for incoming air be ducted into the air cleaner thru downwardly opening passages to prevent casual rain or the like to be drawn directly into the air cleaner. However, when the vehicle travels in extreme adverse rainy or wet conditions the downwardly opening passages maybe exposed to the cloud of splashing water and the like. If considerable quantities of foreign material is ingested and drawn into the engine, catastrophe engine failure can occur resulting in costly repair and down time.

Thus, what is needed is a air cleaner having an air inlet deflector assembly so constructed that a labyrinth path is created for air entering from in front and below the air cleaner and foreign material is blocked and redirect away from the passages for ducting air to the inlet ports. Preferably, the air inlet deflector assembly must be simple and economical in construction and be easily installed. In addition, it should be adaptable to existing air cleaners with a minimum amount of effort and expense.

DISCLOSURE OF THE INVENTION

In one aspect of the present invention an air inlet deflector assembly is provided that includes a formed shield overlapping the inlet ports and having an entrance blocking portion to define a labyrinth path for air entering from the front of the air cleaner and serving to block foreign material from entering from the front and a splash deflector having a plurality of downwardly inclined blocking edges to define a labyrinth passage for air entering the downwardly opening passages of the air cleaner and serving to block and redirect foreign material directed upwardly from elevationally below the splash deflector.

BRIEF DESCRIPTION OF THE DRAWINGS

FIG. 3 is a diagrammatic and enlarged left side elevational view of the left air cleaner taken along line 111—111 of FIG. 1.

BEST MODE FOR CARRYING OUT THE INVENTION

Figure 1:
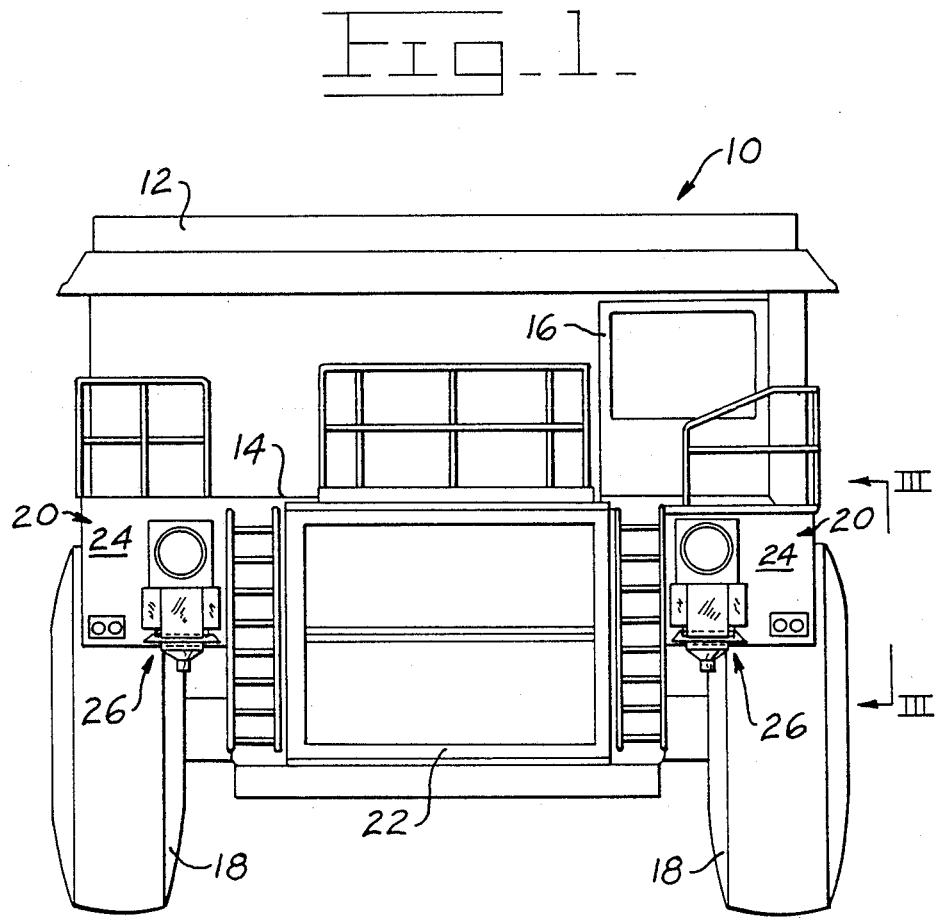
FIG. 1 is a diagrammatic front elevational view of an off-highway truck employing air cleaners having air inlet deflector assemblies constructed in accordance with the present invention.

Referring to FIG. 1 there is shown a front elevational view of a large, generally conventional, off-highway truck 10 having a dump body 12 and a main body portion 14 including a cab 16, a pair of front steerable wheels 18, a pair of front fenders 20, a pair of rear drive wheels (not shown), and an engine compartment 22. In this specific instance, mounted on an outer front surface 24 of each of the front fenders 20 is an air-cleaner 26. The air cleaners 26 are identical to each other and supply filtered air to an engine (not shown) in the engine compartment 22 in a conventional manner.

Figure 2:
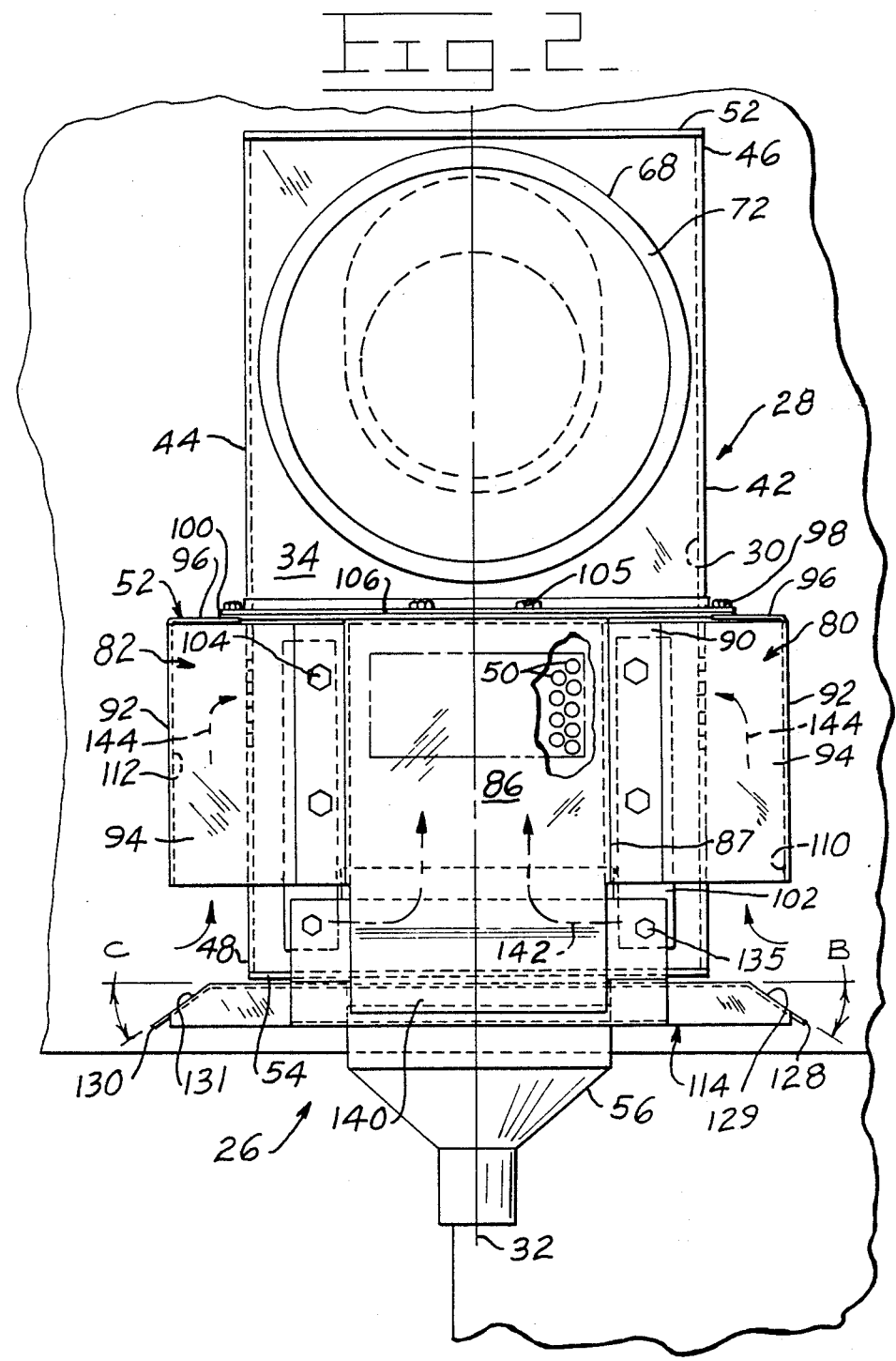
FIG. 2 is a diagrammatic and enlarged front elevational view of one of the air cleaners.

Since the air cleaners are identical to each other only the air cleaner mounted on the left front fender will be described. As is best shown in FIGS. 2 and 3 the air cleaner 26 includes wall means 28 defining an elongate chamber 30 having a central axis 32. The wall means 28 includes a front wall 34, a rear wall 36, a first side or right wall 42 (as viewed in (FIG. 1 and 2), and a second side or left wall 44 individually having an upper end 46 and a lower end 48. The front wall 34 and the first side wall 42 and the second side wall 44 define a plurality of inlet ports 50 generally radially disposed with respect to the axis 32. The wall means 28 further includes a top wall 52 and a bottom wall 54.

A generally elongate particle collecting and valve member 56 is coaxially secured to the bottom wall 54 by welding or the like.

Two pair of mounting brackets 58 and 60 are connected to the rear surface of the rear wall 36 by welding or the like and serve to releasably secure the air cleaner 26 to the outer front surface of the fender 20 by a plurality of threaded fasteners or bolts 62.

An air outlet tube 64 is also secured to the rear wall 36 by welding or the like where it extends through an opening 66 defined by the fender 20 an serves to duct air from the air cleaner 26 to the engine (not shown) in a conventional manner.

A tubular member 68 having a central axis 70 and a removable front cover 72 is secured to the front wall 34 by welding or the like with the axis 70 being arranged generally at a right angle to the axis 32 of chamber 30. Located within the tubular member 68 and chamber 30 are replaceable elements 74 and 76 which filter and clean the air ducted to the engine.

An air inlet deflector assembly 52 includes a formed front shield 78, a formed first or right side shield 80, and a formed second or left side shield 82 connected to the front wall 34, the first side walls 42 and the second side wall 44 respectively in a manner to be described presently. The plurality of shields 78, 80, and 82 overlap the plurality of inlet ports 50 in the side walls 34, 42, and 44, and are known in the industry as rain shields. The front shield 78 of generally u-shaped configuration includes a front wall or surface 86 that is generally parallel to the front wall 34, and a pair of side surfaces 87, and a top surface 88 that is perpendicular to the front wall 34. The side surfaces 86 each have a rear most flange portion 90 that project outwardly at generally a right angle with respect to the side surfaces.

The right and left side shields 80 and 82 each include an outer wall 92 that is generally parallel with the side walls 42 and 44, a forward wall 94 that is generally parallel to the front wall 34, and an upper wall 96 that is generally perpendicular to the side walls 42 and 44. Each of the outer walls 92 extend rearwardly and terminates adjacent the outer front surface of the the fender 20.

Each of the upper walls 96 are removably secured by a plurality of threaded fastener or bolts 98 to an integral flange member 100 on the side walls 42 and 44. A pair of mounting pads 102 are secured to the front wall 34 as by welding. The flange portions 90 of the front shield 78 overlaps inwardly extending forward walls 94 of the side shields 80 and 82 where upon the flange portions 90 and the forward walls 96 are removably secured to the mounting pads 102 by a plurality of threaded fasteners or bolts 104. The top surface 88 of the front shield 78 is removably secured by a plurality of threaded fasteners or bolts 105 to an integral flange member 106 on the front wall 34.

The front shield 78 in combination with the front wall 34 defines a first generally downwardly opening passage 108. The right side shield 80 in combination with the first side wall 42 and the outer front surface 24 of the fender 20 defines a second generally downwardly opening passage 110. The left side shield 82 in combination with the second side wall 44 and the outer front surface 24 of the fender 20 defines a third generally downwardly opening passage 112.

The air inlet deflector assembly 52 further includes a generally horizontally arranged, approximately 2 mm thick, sheet metal splash deflector 114 including a peripherally arranged flange 116 extending radially outwardly from the front wall 34, the right side wall 42, and the left side wall 44. The flange 116 defines a relatively large clearance aperture 118 for valve member 56 and includes a forward downwardly inclined blocking edge 120 that is generally parallel to front wall 34 and having an inclination angle "A" of approximately 30 degrees with respect to the horizontal. The flange 116 further includes a rear edge 122 having an upwardly extending flange portion 124 that projects upwardly to allow it to be secured to the outer front surface 24 of the fender 20 by a plurality of fasteners such as bolts 126. The flange 116 still further includes a first or right side downwardly inclined blocking edge 128 with a generally self-cleaning upper surface 129 that is generally parallel to right side wall 42 and having an inclination angle "B" of approximately 30 degrees, and a second or left side downwardly inclined blocking edge 130 with a generally self-cleaning upper surface 131 that is generally parallel to left side wall 44 and having an inclination angle "C" of approximately 30 degrees.

The forward downwardly inclined blocking edge 120 has a central portion 132 where the sheet material is bent back over itself forming an edge of double thickness that is relative stiff with a generally self-cleaning upper surface 134. The sheet material of the central portion 132 beginning at the upper corner of the blocking 120 extends vertically upwardly to allow it to be secured to the the pair of mounting pads 102 by a pair of threaded fasteners or bolts 135. A lip portion 138 extend between the pads 102 where it terminates adjacent front wall 34.

The front wall 86 of the front shield 78 includes an forward entrance blocking portion 140 that extends downwardly and at rearward angle where it terminates adjacent the upper surface 134 of the forward downwardly inclined blocking edge 120. Air entering the generally downwardly opening passage 108 defined by the shield 78 and front wall 34, must enter generally laterally from below the pair of side surface 86 of the shield. The splash deflector 114 including the peripherally arranged flange 110 and the upper surfaces 134 define labyrinth passages, as defined by the arrows 142, for air entering the generally downwardly opening passage 108.

The splash defector 114 including the peripherally arranged flange 110 and the upper surfaces 129 and 131 define labyrinth passages, as defined by the arrows 144, for air entering the generally downwardly opening passages 110, and 112.

INDUSTRIAL APPLICABILITY

The unique air inlet deflector assembly 52 for an air cleaner 26 in this application is for use on vehicle that must operate in unfavorable wet and rainy conditions. The deflector assembly 52 includes a plurality of formed shields 78, 80, and 82 that overlap the inlet ports 50 to the air cleaner and a splash deflector 114. The formed shields define in combination with the wall 34, 42 and 44 downwardly opening passages 108, 110, and 112. The splash deflector 114 includes a peripherally arraigned flange 116 and downwardly inclined blocking edges 120, 128, and 130 for blocking and redirects foreign material, such as water, away from the passages 108, 110 and 112. The shields 78, 80, and 82 in combination with the splash deflector 114 collectively define a labyrinth for air entering the passages 108, 110, and 1122. It is noted that with the upper surfaces 129, 131, and 134 of the edges 120, 128, and 130 being inclined downwardly foreign material will not redly adhere to the surfaces that could be drawn into the passages 108, 110, and 100.

The front wall 86 of the formed front shield 78 includes an entrance blocking portion 140 that extends downwardly where it terminates adjacent the upper surface 134 of blocking edge 120. The portion 140 significantly prevents foreign material from entering downwardly opening passage 108.

We claim:

1. In an air inlet deflector assembly for an air cleaner or the like of the type having wall means for defining an elongate chamber having a central axis and including a plurality of walls individually having an upper end and a lower end and defining a plurality of inlet ports generally radially disposed with respect with respect to the axis, the deflector assembly includes a plurality of formed shields overlapping the plurality of inlet ports and being connected to the walls to define a plurality of passages adapted to duct air to the plurality of inlet ports, and a splash deflector connected to the lower end of at least a portion of the walls and spaced below the shields, each of the passages defining an entrance adjacent to the splash deflector, the improvement comprising;

the splash deflector including a peripherally arranged flange extending radially outwardly from the walls to generally block foreign material from the entrance of the passages and including a plurality of downwardly inclined blocking edges to collectively define a labyrinth passage between the splash deflector and the lower edge of the plurality of shields for air entering the passages, each of the downwardly inclined blocking edges having an upper surface to inhibit foreign material from collecting on the upper surface, the splash deflector serves to block and redirect foreign material form the area between the splash deflector and the plurality of formed shields.

2. The deflector assembly of claim 1 wherein the plurality of walls includes a front wall and the plurality of formed shields includes a front shield of generally U-shaped cross-section connected to a portion of the front wall, the front shield further includes a front shield wall having an entrance blocking portion extending downwardly adjacent the upper surface of the front blocking edge defining a labyrinth passage for air entering the front downwardly opening passage and serving to block the entry of foreign material directed generally at the front wall.

3. The deflector assembly of claim 1 wherein the plurality of downwardly inclined blocking edges have an inclination angle, with respect to the horizontal, of approximately 30 degrees.

* * * * *